United States Patent [19]

Strausburg

[11] Patent Number: 4,673,120

[45] Date of Patent: Jun. 16, 1987

[54] HAND-HELD TAG ATTACHER, METHOD OF ATTACHING TAGS AND FASTENERS

[75] Inventor: Larry D. Strausburg, Kettering, Ohio

[73] Assignee: Monarch Marking Systems, Inc., Dayton, Ohio

[21] Appl. No.: 654,333

[22] Filed: Sep. 25, 1984

[51] Int. Cl.[4] .................... A43D 69/00; B23P 19/02; B23P 19/04

[52] U.S. Cl. .................... 227/67

[58] Field of Search .................... 227/67, 48; 493/372

[56] References Cited

U.S. PATENT DOCUMENTS

| | | | |
|---|---|---|---|
| 2,331,252 | 10/1943 | Van Tuyl | 93/88 |
| 3,012,484 | 12/1961 | Braun | 93/88 |
| 3,022,508 | 2/1962 | Ruskin | 1/3 |
| 3,385,498 | 5/1968 | Downie | 227/18 |
| 3,595,460 | 7/1971 | Pitkin | 227/48 |
| 3,598,025 | 8/1971 | Cotton | 93/87 |
| 3,734,375 | 5/1973 | Bone et al. | 227/67 |
| 3,880,339 | 4/1975 | Bone | 227/8 |
| 3,896,713 | 7/1975 | Mato | 93/88 |
| 3,898,725 | 8/1975 | Carter, II | 29/211 R |
| 3,948,128 | 4/1976 | Russell | 227/76 X |
| 4,040,555 | 8/1977 | Jenkins | 227/67 |
| 4,049,179 | 9/1977 | Jenkins | 227/67 |
| 4,237,779 | 12/1980 | Kunreuther | 227/30 |
| 4,315,587 | 2/1982 | Ritter et al. | 227/67 |
| 4,323,183 | 4/1982 | Duchin | 227/67 X |
| 4,526,310 | 7/1985 | Lündén et al. | 227/67 |

FOREIGN PATENT DOCUMENTS

| | | |
|---|---|---|
| 0091410 | 12/1983 | European Pat. Off. . |
| 53-38998 | 10/1978 | Japan . |
| 55-116544 | 9/1980 | Japan . |
| 57-16824 | 4/1982 | Japan . |

*Primary Examiner*—Paul A. Bell

*Attorney, Agent, or Firm*—Joseph J. Grass

[57] ABSTRACT

There is disclosed a hand-held tag attacher having a manually engageable handle and a hopper for holding a stack of tags, a feeder for feeding tags one-at-a-time from the stack in the hopper to an attaching position, the hopper being constructed to position the stack at an acute angle relative to the axis of the attacher, the attacher having a hollow needle and a push rod for pushing a bar section of a fastener through a tag at the attaching portion behind the needle and into and through the needle, a mechanism for feeding fasteners one-at-a-time into alignment with the needle, and an actuator disposed at the handle and operable twice to complete a cycle of operating the tag feeder, the push rod and the feeding mechanism.

12 Claims, 18 Drawing Figures

FIG-13
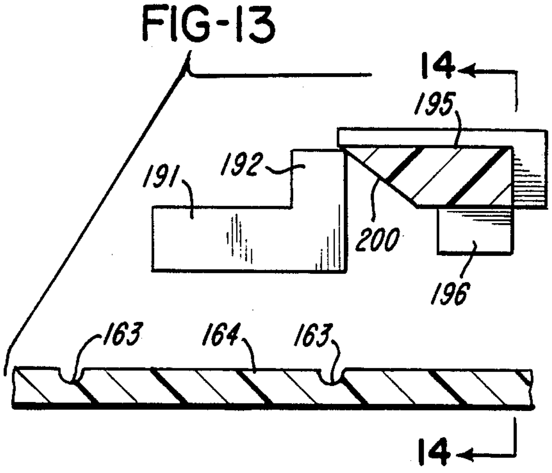
FIG-14
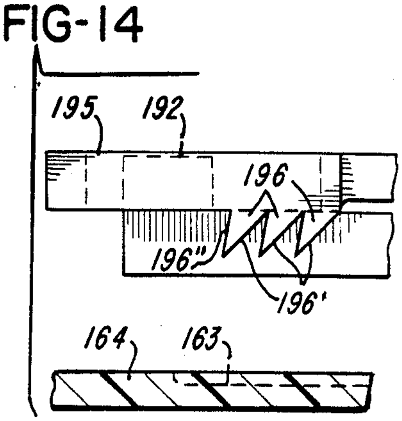
FIG-15
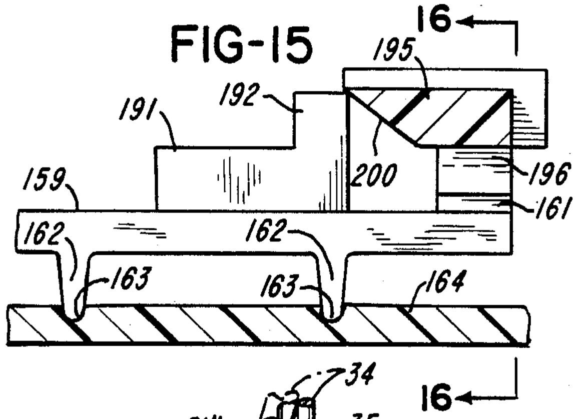
FIG-16
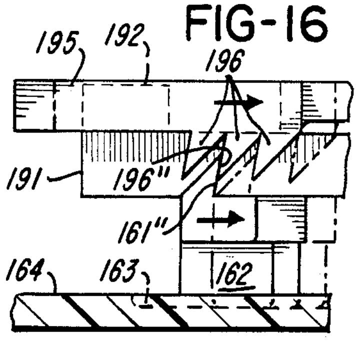
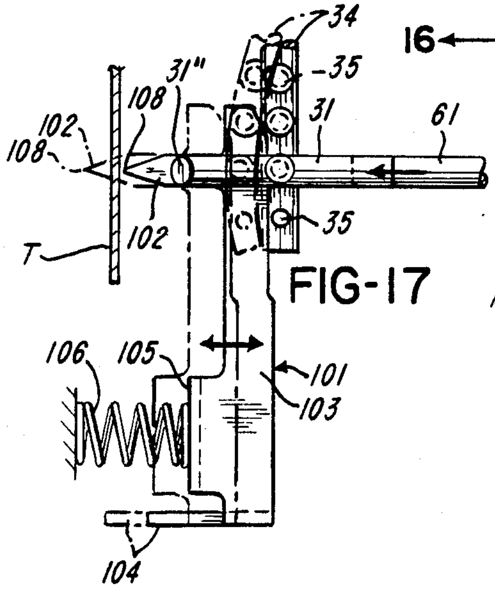
FIG-17
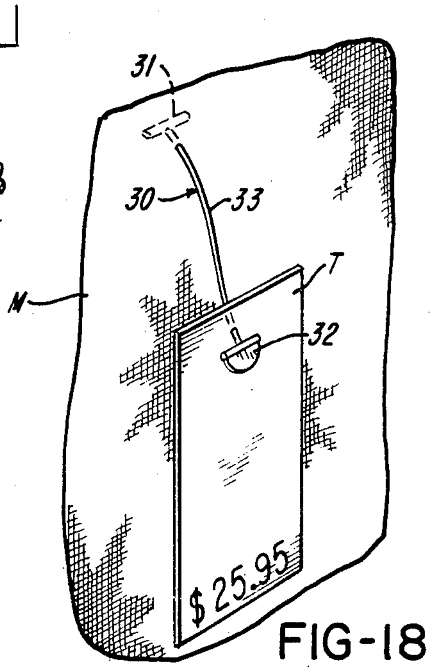
FIG-18

HAND-HELD TAG ATTACHER, METHOD OF ATTACHING TAGS AND FASTENERS

BACKGROUND OF THE INVENTION

This invention relates to tag attaching method and apparatus and tag fasteners.

BRIEF DESCRIPTION OF THE PRIOR ART

The following patents are made of record: U.S. Pat. Nos. 2,331,252; 3,012,484; 3,022,508, 3,385,498; 3,595,460; 3,598,025; 3,734,375; 3,880,339; 3,896,713, 3,898,725; 3,948,128; 4,040,555; 4,049,179; 3,237,779; 4,315,587; 4,323,183; European patent application No. 83850056.9, Publication No. 0 901 410 published Oct. 12, 1983; Japanese patent application No. 54-20935, patent laid-open No. 55-116544, laid open Sept. 8, 1980; Japanese patent application No. 50-120766, publication No. 57-16824 published Apr. 8, 1982; and Japanese patent publication No. 53-38998, published Oct. 18, 1978 based on application No. 49-563507 filed May 14, 1974, now patent No. 958,794 registered June 14, 1979.

SUMMARY OF THE INVENTION

It is a feature of the invention to provide a hand-held tag attacher having a needle for dispensing plastic fasteners and a tag hopper disposed rearwardly of the front end of the tag attacher to facilitate attachment of the tag to merchandise, wherein a tag in the hopper is adapted to be fed to a position behind the needle, and a fastener is adapted to be driven through the tag and merchandise.

It is another feature of the invention to provide a hand-held tag attacher having a hopper for receiving a stack of tags, in which a manually operable actuator is disposed at the handle and is operated twice to complete a cycle which involves feeding a tag to an attaching position, advancing a fastener to a position to be disposed, and operating a push rod to dispose a fastener through the tag and merchandise.

It is another feature of the invention to provide a hand-held tag attacher wherein a knife is used to weaken a tag and wherein a bar section of a fastener is inserted through the weakening in the tag and through a needle.

It is another feature of the invention to provide a hand-held tag attacher having a hopper, wherein the hopper is arranged to hold the tags at an acute angle relative to the longitudinal axis of the attacher to promote ready maneuverability of the attacher with respect to merchandise.

It is another feature of the invention to provide a hand-held tag attacher in which a push rod is used to push a bar section of a fastener through a hollow needle, wherein the attacher has a handle and an actuator disposed at the handle, and wherein a toggle mechanism movable in response to movement of the actuator moves the push rod to push a bar section of a fastener through the needle.

It is a further feature of the invention to provide a hand-held tag attacher having an improved gear drive for a feed pawl.

It is another feature of the invention to provide a hand-held tag attacher having a hopper and mechanism including gearing for moving a tag from the hopper to an attaching position.

It is another feature of the invention to provide a hand-held tag attacher having a hopper adapted to receive a stack of tags, wherein the hopper includes improved rear and side guides for the stack.

It is a further feature of the invention to provide a clip of fasteners having generally cylindrical bar sections, wherein one of the end faces of each bar section is truncated at an oblique angle.

It is another feature of the invention to provide methods for accomplishing tag feeding, fastener advance and the pushing of a bar section through a hollow needle to attain the above-described fastener in a hand-held tag attacher.

Other objects and features of the invention will be readily apparent to those skilled in the art to which the invention pertains.

BRIEF DESCRIPTION OF THE DRAWINGS

FIG. 13 is a view taken generally along line 13—13 of FIG. 8;

FIG. 14 is a view taken generally along line 14—14 of FIG. 13;

FIG. 15 is a view taken generally along line 15—15 of FIG. 9;

FIG. 16 is a viaw taken generally along line 16—16 of FIG. 15;

FIG. 17 is an enlarged elevational view showing the tag-piercing action of the knife when the push rod is actuated; and FIG. 18 is a perspective view showing a tag attached to merchandise M by a fastener.

DESCRIPTION OF THE PREFERRED EMBODIMENT

Figure 1:
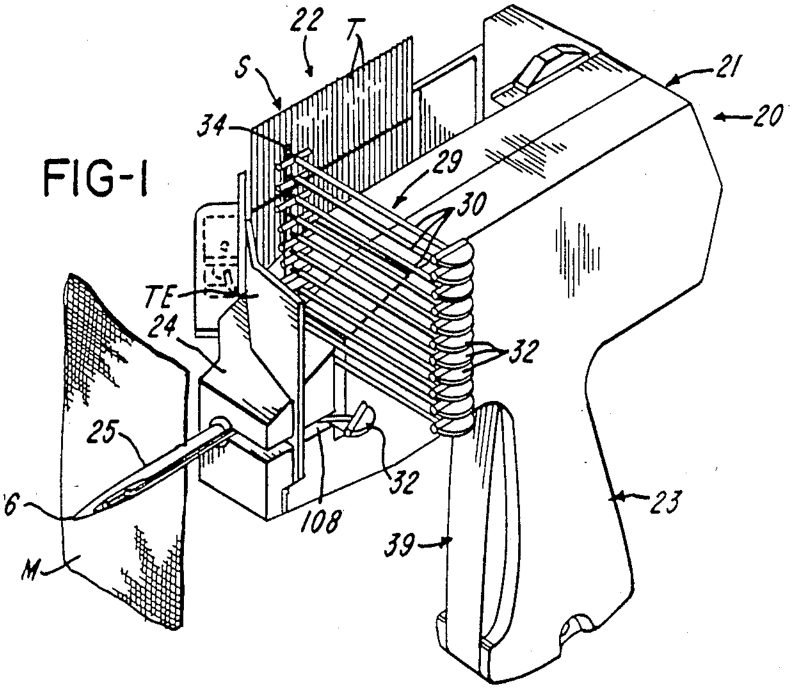
FIG. 1 is a perspective view of a hand-held tag attacher in accordance with the invention; with a tag having been fed from a stack in a hopper to a waiting position, a needle having been pushed through merchandise, and a bar section of a fastener having been almost completely rejected from the needle.

With reference to FIG. 1, there is shown a hand-held tag attacher generally indicated at 20. The tag attacher 20 has a body 21 with a hopper 22 adapted to receive and hold a stack S of tags T. The body 21 also a handle 23. The body 21 has a front end portion 24 at which a hollow needle 25 is removably mounted. The needle 25 terminates at a pointed end 26 and has an elongate needle bore 27 (FIG. 4) and an elongate side slot or side opening 28 (FIG. 5) which communicates with the needle bore 27. A one-piece molded clip 29 of fasteners 30 is shown in FIG. 1 to be loaded into a guideway 21' of the tag attacher 20. Each fastener 30 includes a bar section 31 and a button section 32 joined by a filament section 33. A rod or runner 34 is connected to each bar section 31 by a connector or neck 35. FIG. 1 shows an endmost tag TE in a waiting or attaching position with the needle 25 having passed through merchandise M.

Figure 3:
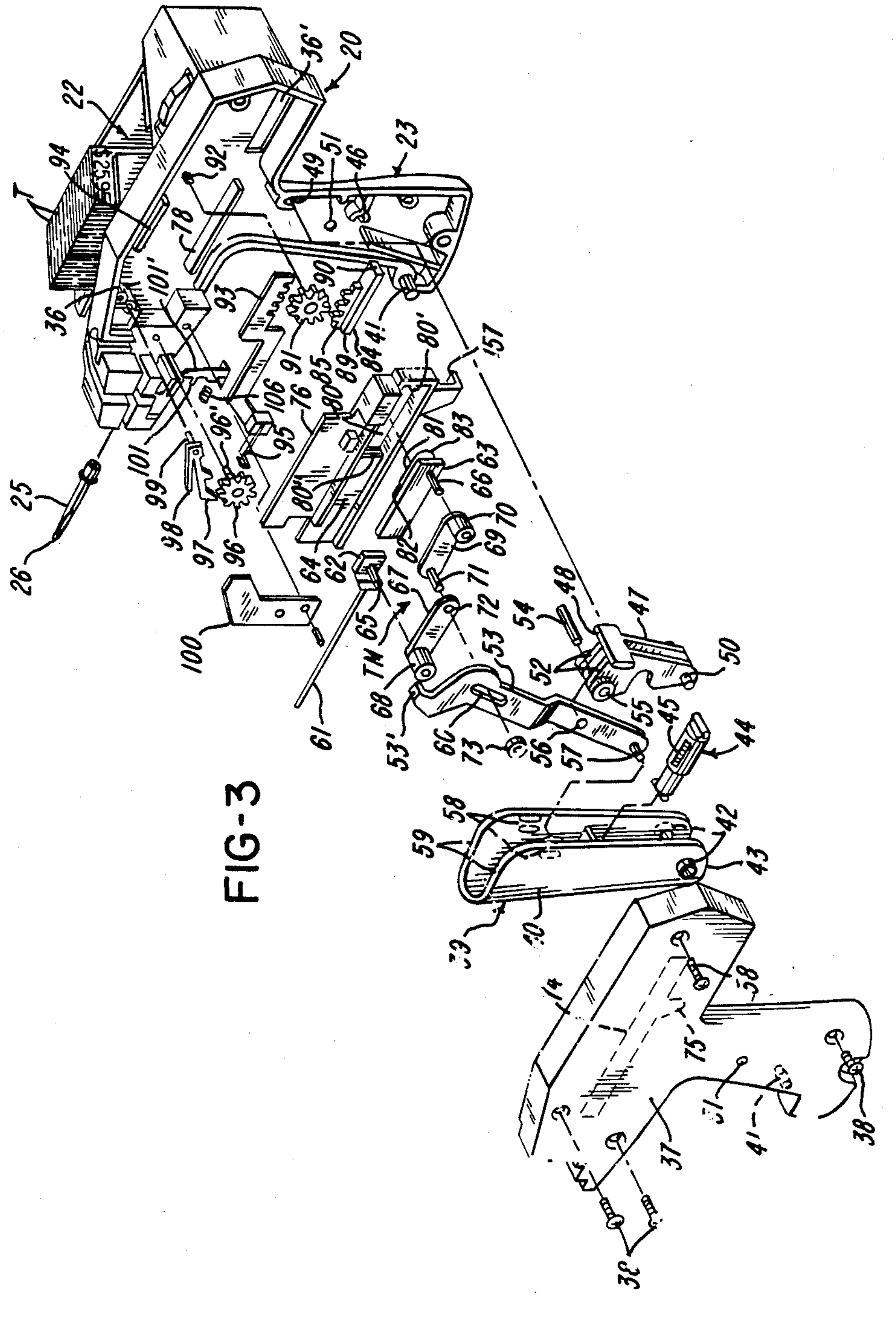
FIG. 3 is a partially exploded view of the attacher shown in FIG. 1.

With reference to FIG. 3, the body 21 is shown to include body sections 36 and 37 secured together by screws 38. An actuator generally indicated at 39 is shown to comprise a lever 40 pivotally mounted to a lower end portion 43 of the handle 23 on pins 41 received in tubular projections 42 at lower end portion 43 of the lever 40. A compression spring module or assembly 44 includes a compression spring 45 and bears against a pocket 46 in the handle 23 and against the lever 40 to urge the lever 40 counterclockwise (FIG. 3) to an initial or unactuated position.

A stationary bracket 47 has a projection 48 received in a pocket 49 and a pin 50 received in aligned holes 51 in the body sections 36 and 37. The bracket 47 has spaced walls 52 which straddle a lever 53. A pin 54 received in holes 55 in walls 52 passes through a hole 56 in the lever 53. One end portion of the lever 53 has a pin 57 received in slots 58 formed in spaced wall portions 59 of the lever 40. The lever 53 has an elongate slot 60.

A push rod or ejector 61 is mounted to a slide 62. The slide 62 and another slide 63 are slidably received in a guideway 64. The slides 62 and 63 mount respective pivot pins 65 and 66. The pivot pin 65 is received in one end portion of a link 67 and extends into an annular guide 68. The pivot pin 66 is received in one end portion of a link 69 and extends into an annular guide 70. The other end portion of the link 69 mounts a pin 71 which passes through a hole 72 in the other end portion of the link 67 and through the slot 60. A guide roller 73 is rotatably mounted on the pin 71. The guides 68 and 70 are guided for straight line movement in a straight guide slot or track 74 in the body section 37 and the roller 73 is guided for movement along an arcuate path in an arcuate guide slot or track 75 which opens into the slot 74 and is also guided in the track 74.

A slide 76 is slidably mounted to the body section 36 for straight line movement by guides 77 and 78 which define a slot 79. The slides 62 and 63 are spaced apart and can slide relative to each other on the slide 76. The slide 76 has a slot 80 which receives a projection 81 having spaced abutment faces 82 and 83. The slot 80 is longer than the distance between abutment faces 82 and 83 so that the slide 63 is able to move through a limited distance relative to the slide 76.

Figure 4:
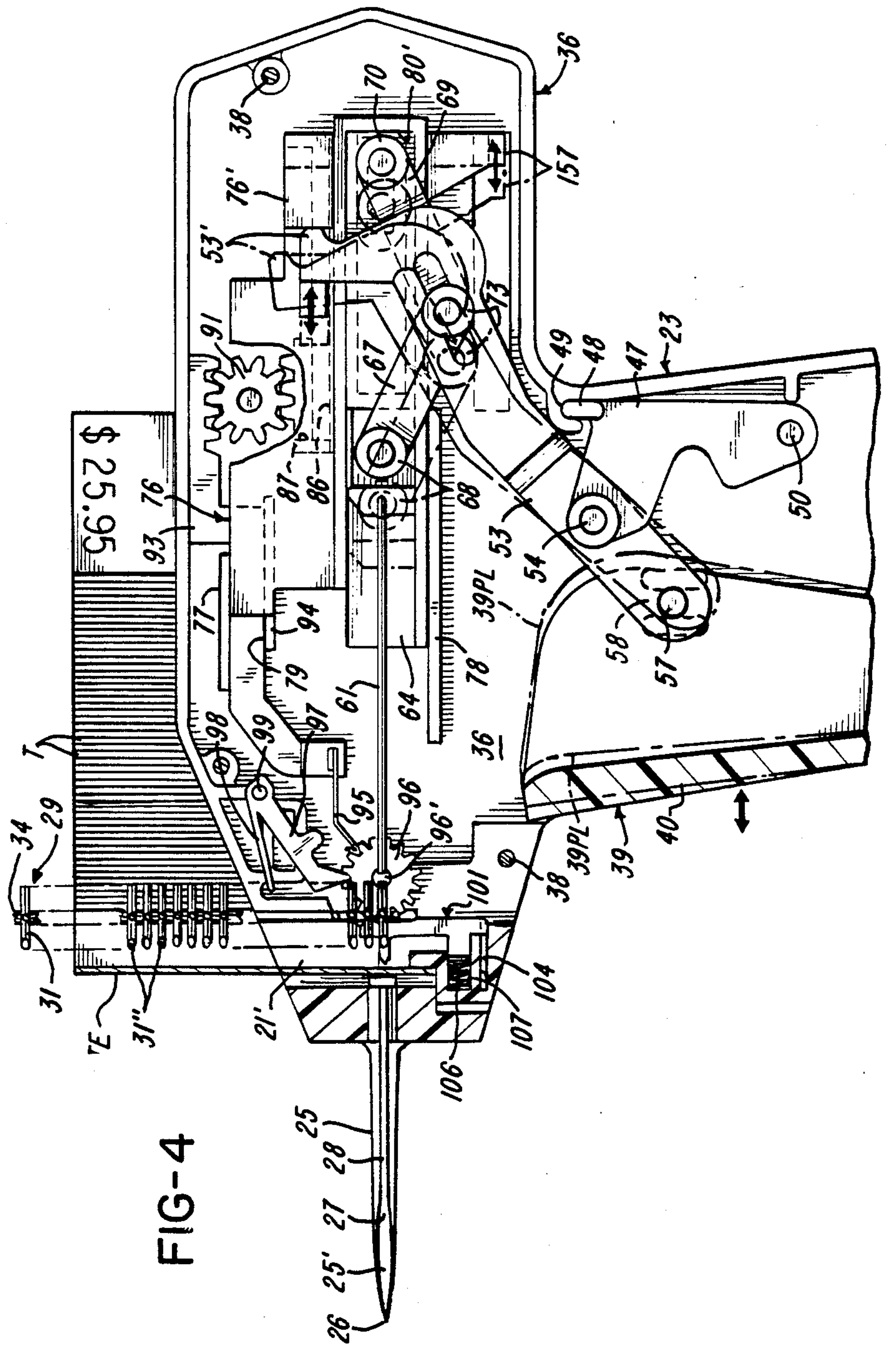
FIG. 4 is a partly broken away elevational view of the attacher with solid lines indicating the initial position.
Figure 5:
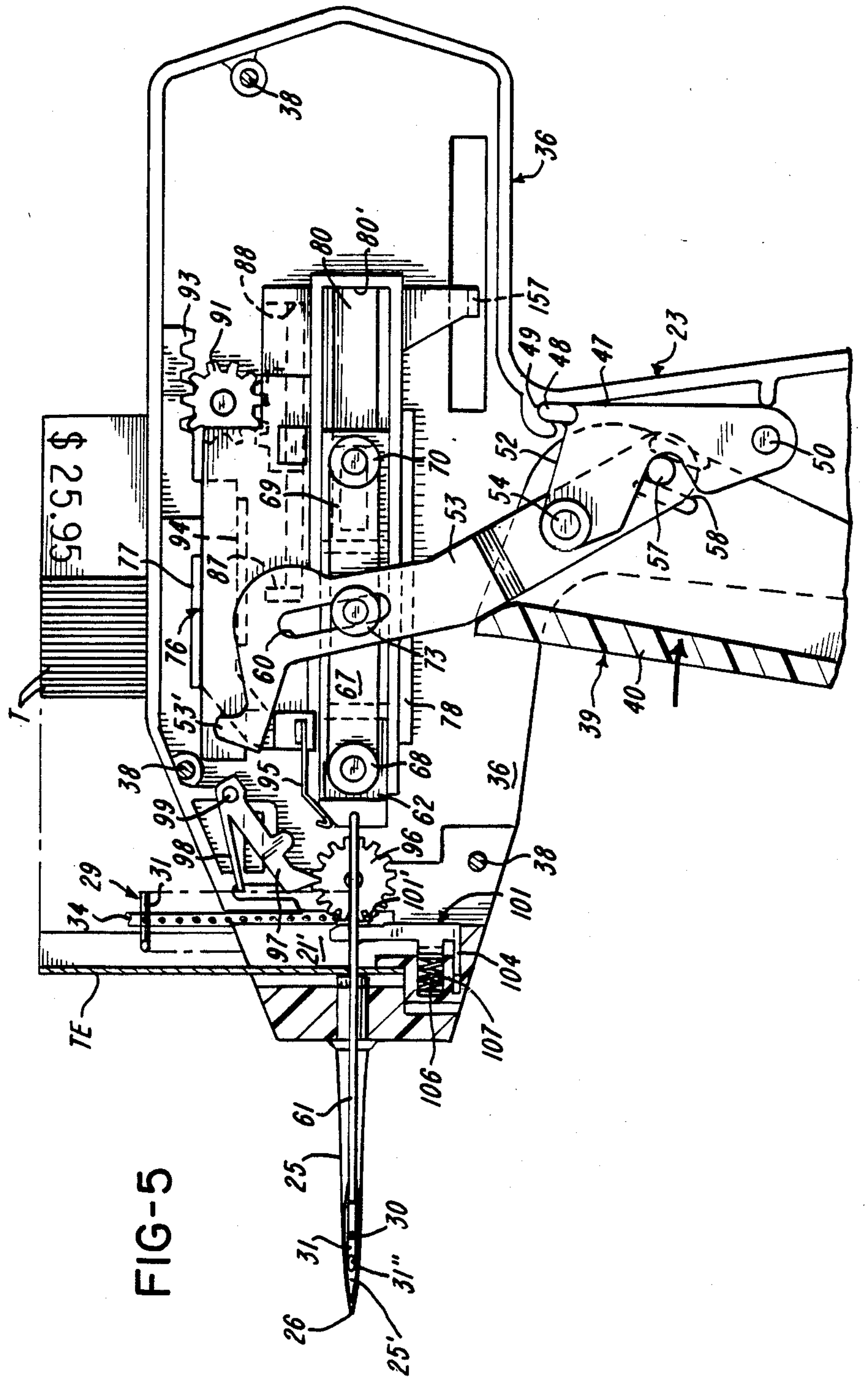
FIG. 5 is a view similar to FIG. 4, but showing the advanced or actuated position.

A slide 84 having a rack 85 is slidably mounted on the slide 76 in a slot 86 having abutment faces 87 and 88 (FIGS. 4 and 5). The slide 84 has abutment faces 89 and 90 (FIG. 3) which alternately cooperate with respective abutment faces 87 and 88. The rack 85 is in mesh with a pinion 91 rotatably mounted to the body section 36 by a pin 92. A rack 93 slidably mounted by the guide 77 and a guide 94 meshes with the pinion 91. The rack 93 carries a flexible resilient finger 95 which is cooperable with a toothed feed wheel 96. The feed wheel 96 is rotatable and meshes with the connectors 35 and can advance the clip 29 when the toothed wheel 96 rotates. An anti-backup pawl 97 having an integrally formed spring finger 98 is pivotally mounted on a pin 99. A plate 100 suitably pinned in place is disposed between the push rod 61 and the toothed feed wheel 96.

The push rod 61 is aligned with a bar section 31 of a fastener 30 and with the needle bore 27. The connector 35 is aligned with a knife generally indicated at 101 (FIGS. 3, 4, 5, 7 and 17). The knife 101 has a sharp, narrow V-shaped knife edge 102, an upstanding portion 103 with a knife edge 101', a guide 104, and an abutment face 105 for a spring 106. The spring 106 is shown to be received in a recess or pocket 107. When the push rod 61 pushes forwardly against a bar section 31, the associated connector 35 bears against the cutting edge 101' of the knife 101 and pushes the knife 101 from the solid line position in FIG. 17 to the phantom line position without cutting through the connector 35. In so doing, the rod 34 deflects and pointed end 107 of the knife 101 pierce through the tag T and makes a vertical slit. Upon continued movement of the push rod 61, the connector 35 is severed by cutting edge 101'.

Figure 2:
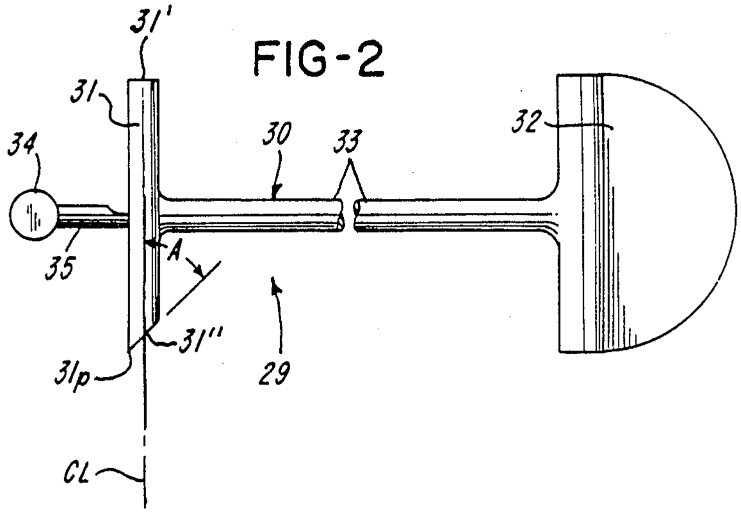
FIG. 2 is an end view of a clip of fasteners in accordance with the invention.

It is noted in FIG. 2 that the bar section 31 is a right circular cylinder which terminates at one end portion at a flat end surface 31' perpendicular to centerline CL. The push rod 61 can push against the end surface 31'. The other end of the bar section 31 is truncated at an angle A oblique to the centerline or axis CL of the bar section 31 to provide a truncated surface or end 31" terminating at a sharp point **31*p*. The point 31*p* is generally aligned with the slit in the tag T made by the knife edge 102. The knife edge 102 weakens the tag T locally and the pointed end 31*p* enters the slit and the bar section 31 makes a hole as the push rod 61 drives the bar section 31 into the needle bore 27. As the bar section 31 is pushed through the needle bore 27, the associated filament section 33 extends through the slot 28 and through a slot 108 at the side of the front end portion 24. When the bar section 31 reaches open end portion 25' of the needle 25, the push rod 61 can eject the bar section 31**.

The operation of the portion of the tag attacher described above will now be described. It will be assumed that a clip 29 of fasteners 30 has been loaded into the tag attacher 20 as shown in FIGS. 1, 4 and 5. The operator grasps the handle 23 in one hand and wraps the fingers about the actuator 39. By squeezing the actuator 39, the actuator 39 pivots clockwise (FIGS. 1 and 4) about pins 41. This causes the lever 53 to be driven counterclockwise (FIGS. 1 and 4) about pivot pin 54 and in turn guide roller 73 moves along the slot 75. The link 67 pivots counterclockwise and the link 69 pivots clockwise. In that the abutment face 83 is already against abutment face 80' of the slide 76, the slide 62 is moved forward (to the left in FIGS. 1 and 4) as the links 67 and 69, which form a toggle or toggle mechanism TM, straighten out. Forward movement of the slide 62 moves the push rod 61 forward and the slit in the tag T is made by the knife edge 102 and thereafter the connector 35 is severed by the knife edge 101' as described above. As the slide 62 is driven forward and the links 67 and 69 became straight and the slide 63 moves to the left until its abutment face 82 abuts abutment face 80′ on the slide 76. As leftward movement of the slide 63 continues, the roller 73 moves along the straight guide track 74 and the slide 63 imparts leftward movement to the slide 76. It is apparent that the movement of the slide 63 relative to the slide 76 until the abutment face 82 contacts the abutment face 80″ constitutes a lost-motion connection. As the slide 76 moves to the left, the abutment face 90 is spaced from abutment face 88 of the slide 76. However, as movement of the slide 76 continues, the abutment face 88 contacts the abutment 90 of the slide 84 and thus the slides 76 and 84 move as a unit. Leftward movement of the rack 85 rotates the pinion 91 clockwise and the pinion 91 moves the rack 93 to the right. Thus, the pawl 95 moves from the position shown in FIG. 4 to the position shown in FIG. 5.

When the actuator 39 is released, the return spring 45 pivots the actuator 39 counterclockwise (FIGS. 3 and 5) and in turn the lever 53 is pivoted clockwise to return the roller 73 rearwardly along the track 74 and thereafter downwardly and rearwardly along track 75 and to cause the link 67 to pivot clockwise and to cause the link 69 to pivot counterclockwise. Slides 62 and 63 move to the right or rearwardly and the abutment face 83 contacts the abutment face 80′ to drive the slide 76 rearwardly. To assure that the slide 76 is driven fully to the right or rearwardly, the lever 53 has an extension 53′ which acts on a projection 76′ on the slide 76 near the very end of return movement of the lever 53. As soon as abutment face 89 of the slide 84 is contacted by the abutment face 87, the slide 84 is driven to the right or rearwardly and thus the rack 85 and the pinion 91 move to move the rack 93 to the left or forwardly from the position shown in FIG. 5 to the position shown in FIG. 4 to cause the pawl 95 to advance the toothed feed wheel 96 by one pitch or one bar-section-to-bar-section distance.

Figure 6:
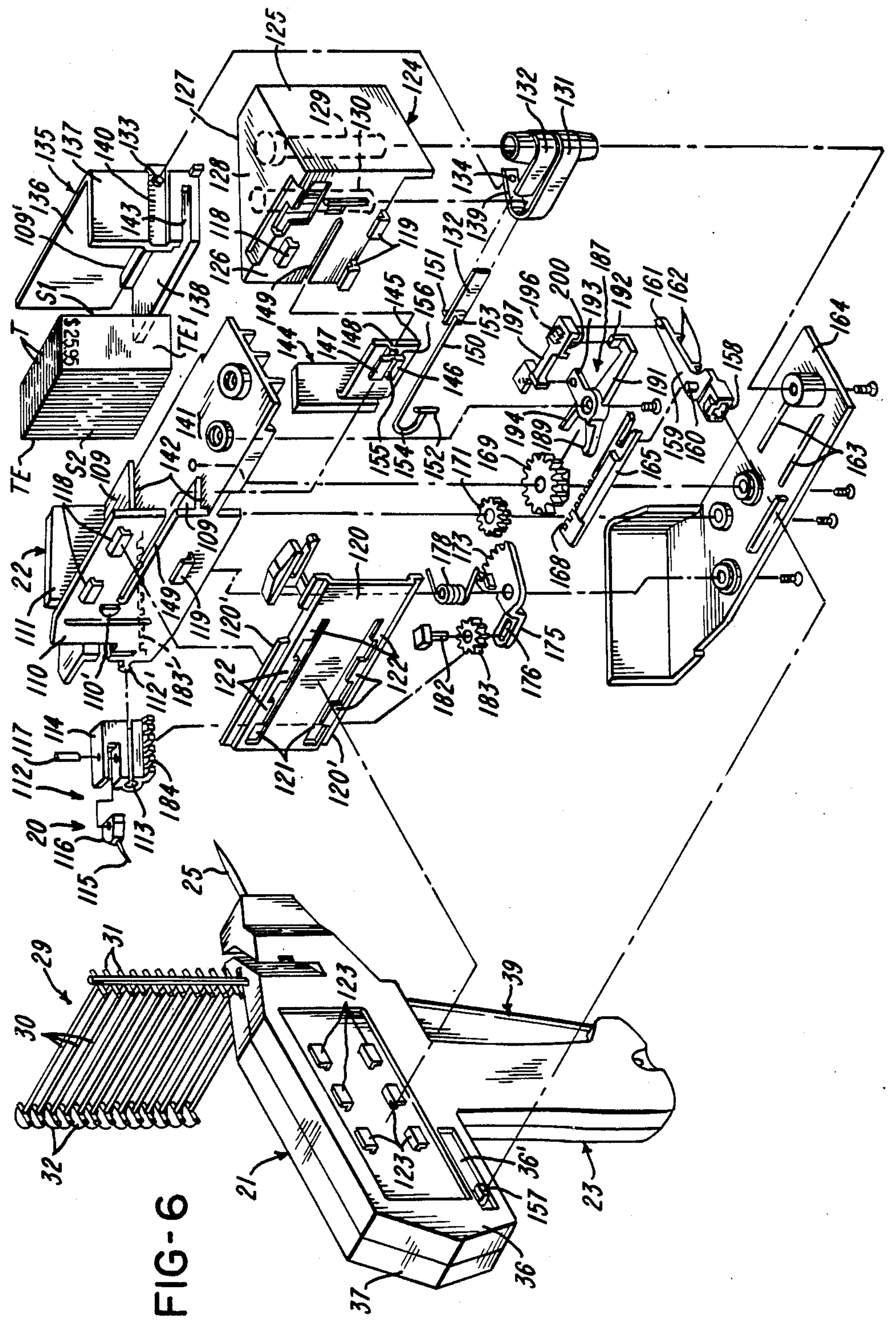
FIG. 6 is another partially exploded view of the attacher shown in FIGS. 1 and 3.

With reference now to FIG. 6, there is shown the hopper 22 having a bottom or floor 109, a side wall 110 and a front wall 111. The front wall 111 slidably mounts a tag feeder generally indicated at 112. The hopper 22 has an elongate generally T-shaped guide 112′ received in a matching undercut groove 113 in a slide 114 of the tag feeder 112. The slide 114 replaceably mounts a pointed needle 115 in a hub 116. A pin 117 passes through the hub 116 and into the slide 114 to releasably hold the hub 116 and its needle 115 in place.

The side wall 110 and a side wall 126 of a support 124 have downwardly extending L-shaped members 118 upwardly facing L-shaped members 119 which lock onto flanges 120′ of a plate 120.

The plate 120 has a pair of vertically spaced horizontal slots 121 with tabs 122. With the plate 120 locked to the side walls 110 and 126, the plate 120 is positioned in proximity to the outside of the body section 36 so that L-shaped projections 123 project through the slots 121 adjacent the tabs 122. By shifting the plate 120 relative to the body section 36, the projections 123 engage tabs 122 and hold the hopper 22 to the body 21.

Figure 10:
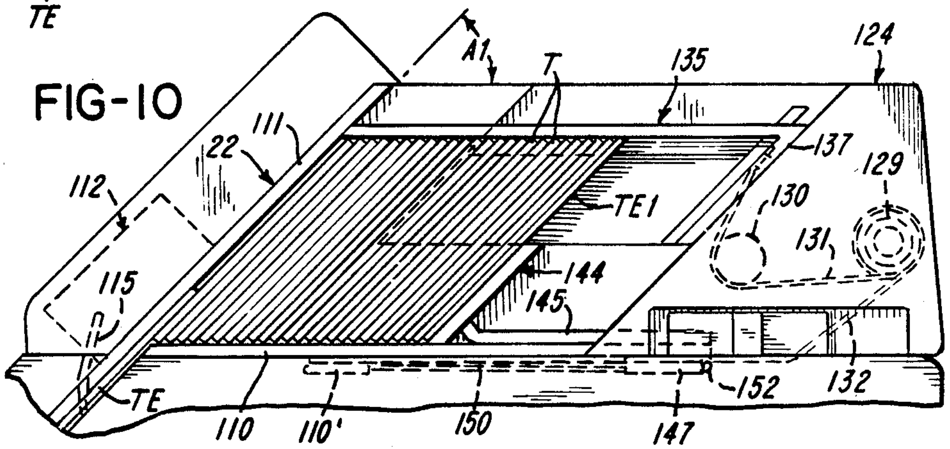
FIG. 10 is a top plan view of the hopper and its stack of tags, with the tag feeder shown in its advanced position.

The tags T are positioned against the front wall 111 and the side wall 110 in a rhombodial configuration as best shown in FIG. 10. The support 124 is box-like and also has a rear wall 125, a front wall 127 and a top 128. The top 128 mounts downwardly depending posts 129 and 130. A pair of side-by-side flat, rolled springs 131 and 132 of the type sold under the trademark Negator are received on the post 129. The spring 131 passes partially about the post 130 and is secured by a pin 133 received in a hole 134 in the spring 131. A side guide or pressure plate generally indicated at 135 has a side wall 136, a rear wall 137 and a guide 138. The spring 131 has an end portion 139 which extends in a groove 140 in a rear wall 137. The hopper 22 has a subfloor 141 spaced below the floor 109 to define a guideway 142. The guide 138 extends into the guideway 142 and guides the pressure plate 135 so that the wall 136 applies slight pressure against side S1 of the stack S under the urging of the spring 131 as best shown in FIG. 10. The rear wall 137 is guided along the front wall 127 of the support 124. The wall 137 has a clearance slot 143 which receives the floor 109. The wall 136 terminates at a ledge 109′ which is coplanar with the floor 109 and also supports the tags T.

A pressure plate generally indicated at 144 has a rearwardly extending member 145 with a T-shaped projection 146. The projection 146 has a head 147 and bar 148 which connects the head 148 and the member 145. The bar 148 is received in a guideway 149 in the walls 110 and 126. The pressure plate 144 and the member 145 are positioned against and slide along the inner surface of the walls 110 and 126. A flexible connector 150 extends about a semi-circular direction-changing projection 110′ on the wall 110. The connector 150 is shown to have bar sections 151 and 152 and a filament section 154. The bar section 152 is assembled into the spring 132 by fitting through a hole 153 in the spring 132. The filament section 154 is received in a groove 155 and the bar 152 and fits against an inclined shoulder 156 which urges the bar section against the bar 148. Thus, the pressure plate 144 is pulled forward. The flat spring 132 enables a relatively uniform force to be applied to the pressure plate 144. The pressure plate 144 acts on the stack S to urge endmost tag TE against the front wall 111. As best shown in FIG. 10, the pressure plate 144 acts against endmost tag TE1. As shown, the pressure plate 144 is inclined relative to AX axis of the attacher 20 at the same angle as the front wall 111, and the side wall 136 of the pressure plate 135 is parallel to the wall 110 and to the axis AX. The front wall 111, the pressure plate 144 and the tags T are inclined at an acute angle Al.

With reference to FIG. 3, the slide 76 is shown to have a projection 157. Referring now also to FIG. 6, the projection 157 extends through a slot 36′ and is snugly received in a pocket or recess 158 in an arm 159. The arm 159 has an upstanding pin 160 and a tooth 161. The arm 159 also has a pair of downwardly depending parallel guides 162 guided in parallel guide grooves 163 in a housing member 164.

A slide 165 is slidably mounted on the housing member 164. The slide 165 has an integral rack 168 which meshes with a spur gear 169. The gear 169 is rotatably mounted on a pin or pivot 170. The gear 169 meshes with a spur gear 171 mounted on a pin or pivot 172. The gear 171 meshes with a gear sector or gear section 173 mounted on a pin or pivot 174. The arm 175 having an elongate slot 176 is joined to the gear section 173. The gear section 173 has a projection 177. A spiral spring 178 wrapped about the pin 174 has an arm 179 which bears against the projection 177 and an arm 180 which bears against a wall 181. The spring 178 urges the gear sector 173 and the slotted arm 175 counterclockwise as viewed in FIG. 7 for example. A pin 182 passes through a spur gear 183 and is received in the slot 176. The gear 183 meshes with a rack 183' on the subfloor 141 and with a rack 184 on the slide 114.

Figures 7, 8:
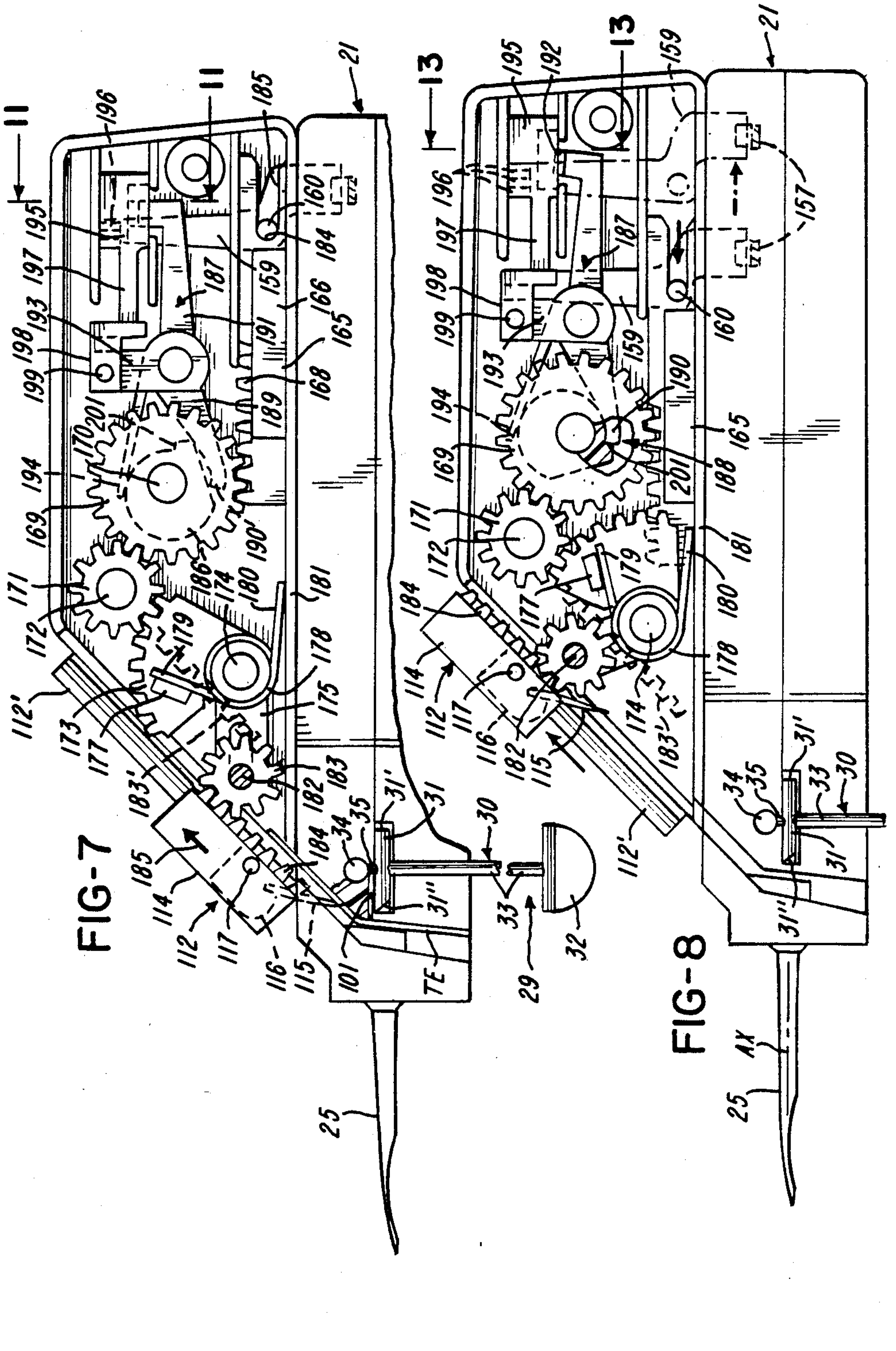
FIG. 7 is a partially broken away top plan view showing the initial position of a tag feeder and mechanism for moving the latching the tag feeder.
FIG. 8 is a view similar to FIG. 7, but showing the tag feeder in its retracted position and the mechanism for moving and latching the tag feeder as having moved so that the tag feeder is latched.

FIG. 7 shows the initial position of the components for moving the tag feeder 112. The pin 160 is against end surface 184 of a slot 185. When the actuator 39 is operated, the arm 159 and its pin 160 are moved to the left in FIG. 7 to move the slide 165 and its rack 168 to the left. This causes clockwise rotation of the gear 169, counterclockwise rotation of the gear 171, and clockwise rotation of the gear section 173 and its arm 175. This in turn causes the gear 183 to rotate clockwise. In that the rack 183' is stationary, the gear 183 moves the tag feeder 112 from its extended or advanced position shown in FIG. 7 in the direction of arrow 185 to the retracted position shown in FIG. 8. It should be noted that the tag feeder 112 moves twice as far as the pin 182.

A cam 186 secured to the gear 169 and a lever generally indicated at 187 cooperate to provide a latch generally indicated at 188. The lever 187 has an arm 189 with a tooth 190, an arm 191 with an upstanding projection 192, an arm 193, and a spring finger 194. The tooth 190 and the spring finger 194 are on opposite sides of the cam 186. The spring finger 194 urges the tooth 190 into continuous contact with the surface of the cam 186.

Figure 11:
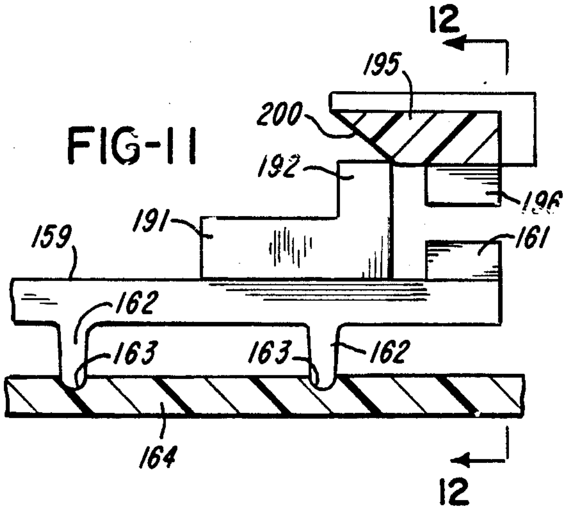
FIG. 11 is a view taken generally along line 11—11 of FIG. 7.
Figure 12:
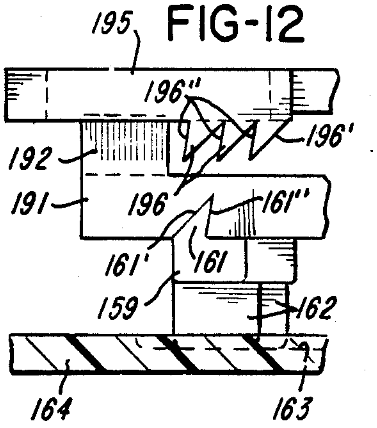
FIG. 12 is a view taken generally along line 12—12 of FIG. 11.

A toothed member 195 having three downwardly depending teeth 196 is connected to a leaf spring 197 which in turn is connected to the arm 193 by a member 198 by a pin 199. Thus, the toothed member 195 is cantilevered to the arm 193 through the leaf spring 197. The leaf spring 197 urges the toothed member 195 downwardly into the position shown in FIGS. 8, 9, 13, 14, 15 and 16. However, in the initial position shown in FIGS. 7, 11 and 12 the projection 192 cooperating with a cam face 200 on the toothed member 195 holds the toothed member 195 in the raised or disengaged position, and thus the teeth 161 and 196 do not engage or cooperate in any way. However, as the gear 169 and the cam 186 rotate clockwise, the tooth 190 rides on the surface of the cam 186 until the tooth 190 falls in behind the tooth 201. The latch 188 is how latched and the tooth 190 is against the low point of the cam 186, and the lever 187 has now moved clockwise from the position shown in FIG. 7 to the position shown in FIG. 8. The projection 192 has now moved from the position shown in FIG. 11 to the position shown in FIG. 13.

Figure 9:
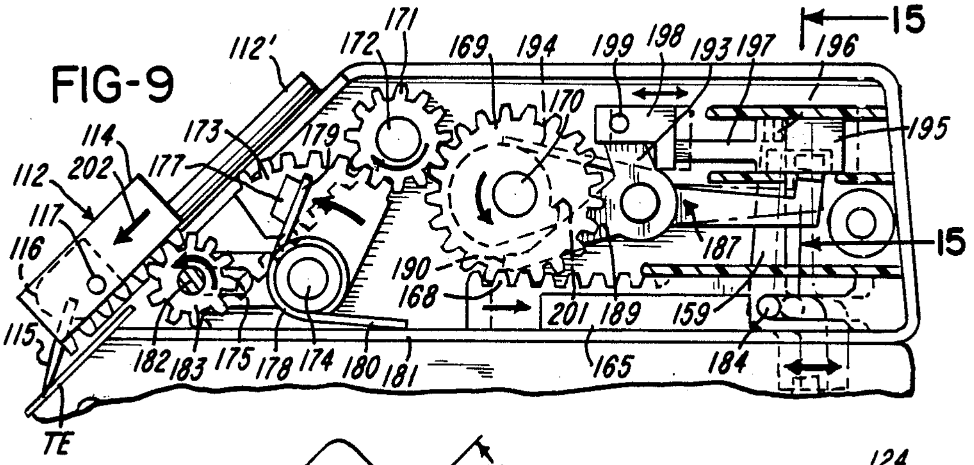
FIG. 9 is a view similar to FIGS. 7 and 8, but showing the tag feeder moved to its extended or advanced position.

When the actuator 39 is released, the return spring 45 causes the slide 76 to be moved to the right (FIG. 5) and thus the arm 159 and its pin 160 also move to the right from the solid line position to the phantom line position in FIG. 8. The latch 188, however, remains latched and the tag feeder 112 remains in its retracted position. As the arm 159 moves to the right, the ramp or cam surface 161' of the tooth 161 cooperate with the ramp or cam surfaces 196' of the teeth 196, and the toothed member 195 is cammed upwardly as the arm 159 moves rearwardly. Partial actuation of the actuator from its initial or unactuated position will again cause the pin 184 to be moved to the left (FIG. 8). In so doing the pin 160 moves in the slot 185 toward the end 184. As soon as drive face 161" encounters a face 196" of any tooth 196 it causes the toothed member 195 to be moved to the left, thereby pivoting the lever 187 counterclockwise to the phantom line position shown in FIG. 9. This results in the latch 188 being tripped and in the toothed member 195 being raised by the projection 192 cooperating with the cam surface 200. The latch 188 is tripped when the tooth 190 clears the shoulder 201. As soon as the latch 188 is tripped, the spring 178 rotates the gear section 173 and the arm 175 counterclockwise, and this causes the gear 171 to be rotated clockwise, the gear 183 to be rotated counterclockwise, and in turn the slide 114 is moved in the direction of arrow 202 from its retracted position shown in FIG. 8 to its extended or advanced position shown in FIGS. 7 and 9. Also, counterclockwise rotation of the gear 169 moves the slide 165 and its rack 168 to the right from the position shown in FIG. 8 to the position shown in FIGS. 7 and 9. As shown in FIGS. 7 and 9 the tag TE is shown in its advanced or waiting position still impaled by the pin 115.

In considering the overall operation of the attacher 20, let it be assumed that a stack S of tags T has been loaded into the hopper 22, with side S2 of the tags T against the wall 110, with the endmost tag TE against the front wall 111 with the pressure plate 135 against S1 of the stack S and with the pressure plate 144 against the endmost tag TE1. Assume also that a clip 29 of fasteners 30 is inserted to a position in which a bar section 31 is aligned with the needle bore 27 and the push rod 61. The actuator 39 is fully operated by manually squeezing the actuator and the actuator 39 moves from its initial position (FIG. 4) to its actuated position (FIG. 5). In so doing, the push rod 61 pushes on the bar section 31 and as the rod 34 flexes to the position shown in phantom lines in FIG. 17, and the knife edge 101' severs the bar section 31 from its respective connector 35. Continued movement of the push rod 61 pushes the bar section 31 through the needle bore 27 while its filament section 33 extends through the slot 108 in the body 21 and the side opening 28 in the needle 25. Also the rack 93 has moved to retract the pawl 95 away from the toothed wheel 96. When the actuator 39 is released, the spring 45 causes the toggle mechanism TM to operate to return the push rod 61 to its initial position. Near the end of the return of the push rod 61, the rack 85 rotates the gear 91 to move the rack 93 and the pawl 95 to the left to the FIG. 4 position to advance the wheel 96 to bring the next bar section 31 into alignment with the bore 27 and the push rod 61.

During the time the actuator 39 was being moved from its initial position to its actuated position, the tag feeder 112 moved from its advanced position (FIG. 7) to its retracted position (FIG. 8) and the latch 188 became latched. Now the actuator 39 is manually actuated again, but this time only partially from the initial (solid line) position in FIG. 4 to the phantom line position 39PL also shown in FIG. 4. This slight movement causes the latch 188 to be tripped so that the tag feeder 112 is driven in the direction of the arrow 202 to its advanced position with needle 115 impaled in the endmost tag TE so that the endmost tag is fed to the attaching or waiting position shown in FIGS. 1, 4, 5, 7, 9 and 10. The attacher 10 is now ready to attach its first tag T to merchandise M. With a tag T in the attaching position in alignment with the push rod 61, the actuator 39 is operated fully to the FIG. 5 position, but this time as the push rod 61 pushes on a bar section 31, the knife 101 is pushed forward by the respective connector 35 against the action of the return spring 106. This causes the knife 101 to move from the solid line position shown in FIG. 17 to the phantom line position in FIG. 17 and thereupon the knife edge 102 makes a slit in the tag T. As the push rod 61 continues to push on the bar section 31 the knife edge 101', acting against the connector 35 immediately adjacent the bar section 31, causes the bar section 31 to be severed from the connector 35 and thereafter the push rod proceeds to push the bar section 31 through the needle bore 27. Once the bar section 31 is severed, the return spring 106 returns the knife 101 to its original position. Release of the actuator against causes the pawl 95 to advance the toothed feed wheel 96 and hence the clip 29. Partial re-actuation of the actuator 39 causes the latch 188 to be tripped and hence the tag feeder 112 feeds the next tag to the waiting position.

Other embodiments and modifications of this invention will suggest themselves to those skilled in the art and all such of these as some within the spirit of this invention are included within its scope as best defined by the appended claims.

I claim:

1. A hand-held tag attacher for attaching tags to merchandise using fasteners, each fastener having a bar section and a bottom section joined by a filament section, the attacher being solely manually powered and comprising: an attacher body having a hopper adapted to receive a stack of tags and a manually engageable handle, a needle mounted to the body and having an elongate needle bore and an elongate side opening communicating with the needle bore, means for feeding an endmost tag from the hopper to an attaching position in alignment with the needle, means for advancing one bar section of a fastener at a time into alignment with the needle bore, a push rod engageable with a bar section of a fastener and movable along an axis for driving the bar section through the needle bore while its filament section extends through the side opening, the hopper having a front wall sweeping rearwardly with respect to the front end portion of the body and at an oblique angle with respect to the axis to hold a stack of tags in a rhomboidal arrangement, means for moving the bar section advancing means, the push rod and the tag feeding means through a cycle, wherein the moving means includes a slide movably mounted on the body, manually operable actuating means disposed at the handle, means for coupling the actuating means to the slide to effect reciprocating movement of the slide upon actuation and release of the actuating means, means for coupling the slide to the push rod, means responsive to the movement of the slide for operating the bar section advancing means, and means for coupling the slide to the tag feeding means.

2. A hand-held tag attacher as defined in claim 1, wherein the means for coupling the slide to the tag feeding means includes a lever driven by the slide.

3. A hand-held tag attacher as defined in claim 1, wherein the means for coupling the slide to the tag feeding means includes a cam driven by the slide and a cam follower driven by the cam and coupled to the tag feeding means.

4. A hand-held tag attacher as defined in claim 3, wherein the follower includes a lever.

5. A hand held tag attacher as defined in claim 1, wherein the means for coupling the slide to the tag feeding means includes a cam coupled to the slide and a lever moved by the dam, and wherein the tag feeding means includes a pin engageable with an endmost tag in the stack.

6. A hand-held tag attacher for attaching tags to merchandise using fasteners, each fastener having a bar section and a button section joined by a filament section, the attacher being solely manually powered and comprising: an attacher body having a hopper adapted to receive a stack of tags and having a manually engageable handle, a needle mounted to the body and having an elongate needle bore and an elongate side opening communicating with the needle bore, means for advancing one bar section at a time into alignment with the needle bore, a push rod engageable with a bar section of a fastener and movable along an axis for driving the bar section through the needle bore while its filament section extends through the side opening, the hopper having a front wall sweeping rearwardly with respect to the front end portion of the body and at an oblique angle with respect to the axis to hold a stack of tags in a rhomboidal arrangement, a tag feeder engageable with an endmost tag in the hopper for feeding the endmost tag from its position in the stack along a path to an attaching position in alignment with the needle, means for moving the bar section advancing means, the push rod and the tag feeder through a cycle, wherein the moving means includes manually operable actuating means disposed at the handle, wherein the moving means further includes a cam and a lever driven by the cam, wherein the tag feeder includes a slide, a pin mounted for reciprocating movement on the slide, and means for coupling the lever to the slide.

7. A hand-held tag attacher for attaching tags to merchandise using fasteners, each fastener having a bar section and a button section joinced by a filament section, the attacher being solely manually powered and comprising: an attacher body having a hopper adapted to receive a stack of tags and a manually engageable handle, a needle mounted to the body and having an elongate needle bore and an elongate side opening communicating with the needle bore, manually operable actuating means disposed at the handle and being operable by the operator's fingers while the handle is held in the hand, a tag feeder engageable with an endmost tag in the stack and movable between a retracted position and an advanced position in which a tag has been moved to an attaching position, means responsive to movement of the actuating means for moving the tag feeder from the retracted position to the advanced position and for moving the tag feeder from the advanced position to the retracted position, means responsive to movement of the actuating means for advancing one bar section of a fastener at a time into alignment with the needle bore, a push rod responsive to movement of the actuating means and engageable with a bar section of a fastener and movable along an axis for driving the bar section through the needle bore while its filament section extends through the side opening, and the hopper having a front wall sweeping rearwardly with respect to the front end portion of the body and at an oblique angle with respect to the axis to hold a stack of tags in a rhomboidal arrangement.

8. A hand-held tag attacher as defined in claim 7, wherein the angle of the front wall relative to the axis is between 30 degrees and 75 degrees.

9. A hand-held tag attacher as defined in claim 7, wherein the tag feeder includes a slide movable generally parallel to the front wall, and at least one pointed pin mounted on the slide for engaging the endmost tag to move the endmost tag into alignment with the axis.

10. A hand-held tag attacher as defined in claim 7, wherein the angle of the front wall relative to the axis is about 45 degrees.

11. A hand-held tag attacher for attaching tags to merchandise using fasteners, each fastener having a bar section and a button section joined by a filament section, the attacher comprising: an attacher body having a hopper adapted to receive a stack of tags and having a manually engageable handle, a needle mounted on the body and having an elongate needle bore and an elongate side opening communicating with the needle bore, means for advancing one bar section at a time into alignment with the needle bore, a push rod engageable with a bar section of a fastener and movable along an axis for driving the bar section through the needle bore while its filament section extends through the side opening, the hopper having a front wall sweeping rearwardly with respect to the front end portion of the body and at an oblique angle with respect to the axis to hold a stack of tags in a rhomboidal arrangement, a tag feeder engageable with an endmost tag in the hopper for feeding the endmost tag from its position in the stack along a path to an attaching position in alignment with the needle, actuating means including a manually operable actuator disposed at the handle, means including a slide movable in response to the movement of the actuator for moving the push rod, the bar section advancing means and the tag feeder, a cam movable by the slide, and a follower cooperable with the cam for moving the tag feeder in one direction to bring the tag to the attaching position when the actuator is manually operated and for moving the tag feeder in the opposite direction when the actuator is released.

12. A hand-held tag attacher for attaching tags to merchandise using fasteners, each fastener having a bar section and a button section joined by a filament section, the attacher comprising: an attacher body having a hopper adapted to receive a stack of tags and having a manually engageable handle, a needle mounted on the body and having an elongate needle bore and an elongate side opening communicating with the needle bore, means for advancing one bar section at a time into alginment with the needle bore, a push rod engageable with a bar section of a fastener and movable along an axis for driving the bar section through the needle bore while its filament section extends through the side opening, the hopper having a front wall sweeping rearwardly with respect to the front end portion of the body and at an oblique angle with respect to the axis to hold a stack of tags in rhomboidal arrangement, a tag feeder engageable with an endmost tag in the hopper for feeding the endmost tag from its position in the stack along a path to an attaching position in alignment with the needle, actuating means including a manually operable actuator disposed at the handle, means including a slide movable in response to the movement of the actuator for moving the push rod, the fastener advancing means and the tag feeder, and a lever movable by the slide in one direction to bring the tag to the attaching position when the actuator is manually operated and for moving the feeder in the opposite direction when the actuator is released.

* * * * *

UNITED STATES PATENT AND TRADEMARK OFFICE
CERTIFICATE OF CORRECTION

PATENT NO. : 4,673,120

DATED : June 16, 1987

INVENTOR(S) : Larry D. Strausburg

It is certified that error appears in the above-identified patent and that said Letters Patent are hereby corrected as shown below:

Column 2, line 61, "view" has been misspelled. Column 5, line 2, "80' " should be --80"--. Column 9, line 59, "dam" should be --cam--.

Signed and Sealed this

Twentieth Day of October, 1987

*Attest:*

DONALD J. QUIGG

*Attesting Officer* *Commissioner of Patents and Trademarks*